US011343080B1

(12) United States Patent
Bagley

(10) Patent No.: US 11,343,080 B1
(45) Date of Patent: May 24, 2022

(54) SYSTEM AND METHOD FOR DATA PRIVACY AND AUTHENTICATION

(71) Applicant: Norman J Bagley, North Andover, MA (US)

(72) Inventor: Norman J Bagley, North Andover, MA (US)

( * ) Notice: Subject to any disclaimer, the term of this patent is extended or adjusted under 35 U.S.C. 154(b) by 6 days.

(21) Appl. No.: 17/097,834

(22) Filed: Nov. 13, 2020

Related U.S. Application Data

(60) Provisional application No. 62/936,538, filed on Nov. 17, 2019.

(51) Int. Cl.
*H04L 29/06* (2006.01)
*H04L 9/08* (2006.01)
*G06F 21/62* (2013.01)
*H04L 9/32* (2006.01)

(52) U.S. Cl.
CPC ........ *H04L 9/0825* (2013.01); *G06F 21/6245* (2013.01); *H04L 9/088* (2013.01); *H04L 9/0866* (2013.01); *H04L 9/0894* (2013.01); *H04L 9/3226* (2013.01)

(58) Field of Classification Search
CPC ..... H04L 9/0825; H04L 9/0866; H04L 9/088; H04L 9/0894; H04L 9/3226; H04L 63/0428; H04L 9/14; H04L 9/3247; G06F 21/6245; G06F 21/6263
See application file for complete search history.

(56) References Cited

U.S. PATENT DOCUMENTS

| | | | | |
|---|---|---|---|---|
| 2013/0019092 A1* | 1/2013 | Levow | ................ | H04L 63/1466 713/155 |
| 2014/0337635 A1* | 11/2014 | Konvalinka | ............ | H04L 67/04 713/186 |
| 2015/0186657 A1* | 7/2015 | Nakhjiri | ................ | H04L 9/0894 713/155 |

* cited by examiner

*Primary Examiner* — Yogesh Paliwal

(57) ABSTRACT

A system and method for insuring privacy, access control, and authentication for electronic user data submitted to social media platforms, email systems, web sites, and other electronics and software based communication and storage systems is provided. Control over user data is provided such that the user can determine which other users may have access to the data, and only such permitted users will be able to access the data. All other parties, including the operators of the system platform in use, will not be able to view the submitted data. Authentication is provided such that the viewer of the data is ensured that the author of the data is in fact the author indicated in the data, and that the data has not been modified since it was submitted. Data privacy, access control, and authentication is provided in a seamless and convenient manner for both the author and recipients of the data.

16 Claims, 7 Drawing Sheets

500

600

SYSTEM AND METHOD FOR DATA PRIVACY AND AUTHENTICATION

This is a nonprovisional patent application claiming priority of U.S. Provisional Application for Patent No. 62/936,538 filed on Nov. 17, 2019, the complete subject matter of which is incorporated herein by reference in its entirety.

BACKGROUND OF THE INVENTION

1. Field of the Invention

The invention pertains generally to the field of electronic data communications and storage and more particularly to systems and methods for insuring privacy, access control, and authentication of electronic data when used with systems including social media platforms, email systems, web sites, and other similar systems.

2. Description of the Related Art

Electronic data communication and storage of electronic user data is pervasive. Various service providers operate service platforms, such as social media platforms, email systems, data sharing systems, and web sites that allow user comments. These platforms enable users to enter data, have the data stored on the service platform storage systems, and have the data shared with other users.

However, people do not always have effective control over the data they submit. The business models of many leading social media and email platforms is actually dependent on the fact that the platform has access to the user data. This user data is in turn used, for example, to provide targeted product advertising to the user. It is used to draw conclusions about the wants, needs, and desires of the users. In some recent situations it has been used to attempt to influence the outcome of elections for public office.

It is also true that once a user submits data to one of these platforms, there is no guarantee that it will not be released to the general public through some inadvertent or malicious occurrence.

Although the data platforms may give the impression, or even provide a written policy that user data will not be used or released in a way that the user would not approve of, this is difficult to guarantee.

A related issue is that it is generally not possible for a user to be absolutely sure that received data or data viewed on a communication platform has in fact been authored by the person that is being presented as the author, or that it has not been modified.

Cryptography is in wide use in electronic communication systems today, and has an important role to play in solving some of the issues described. It is currently used to protect users from electronic eavesdropping. Cryptography is in use for electronic signing of documents. It is used to transmit credit card numbers securely. It can, with some effort, be used to send email to specific other people in encrypted form such that only the intended recipient can view the email.

The related art has disclosed various methods and systems for providing data privacy.

Reference may be had to U.S. Pat. No. 10,445,525 entitled 'Data Privacy management system and method' which discloses a method for managing user data among multiple service providers and enabling user control of the dissemination of the user data.

Reference may further be had to U.S. Pat. No. 10,318,759 entitled 'Method and apparatus for enforcing data privacy' which discloses a method for controlling access to local data associated with a device by using privacy profile objects and privacy policies associated with the local device.

Reference may further be had to U.S. Pat. No. 10,121,015 entitled 'Management of data privacy and security in a pervasive computing environment' which discloses a method to provide negotiation control to data such that a person or entity can negotiate the use of data gathered beyond what is needed for a particular use by a third party transaction.

Reference may further be had to U.S. Pat. No. 9,116,888 entitled 'Customer controlled data privacy protection in public cloud' which discloses a method in which data to be submitted to a remote node is selectively protected.

Reference may further be had to U.S. Pat. No. 8,295,490 entitled 'Method and system for storing and providing an encryption key for data storage' which discloses a method for providing an encryption key to a user.

Prior art in the related fields discloses various methods and systems for achieving some elements of privacy, access control, and authentication. However, prior art does not provide a data privacy system and method that enables users to have full control over which specific other users and systems may have access to data that they submit to social media platforms, email systems, and other web sites, and for the data to be digitally signed and authenticated, and for this capability to be seamlessly integrated with the platform, and be easy to use. It is the object of the present invention to use cryptography and other mechanisms to provide these features.

The following drawings, summary, and detailed description show and describe the present subject matter by way of illustration, and it will be readily apparent to those skilled in the art that other configurations of the present subject matter are possible and fall within the scope of the invention. The drawings and descriptions are to be regarded as illustrative and not restrictive in nature.

SUMMARY OF THE INVENTION

In accordance with the present invention, there is provided a data privacy, access control, and authentication system and method that may consist of privacy client and privacy server components. The components effect data privacy, access control, and authentication for data submitted by a user to a service provider platform server.

The privacy server component provides a mechanism to allow users to create accounts which store configuration data specific to the user, and mechanisms for the user to be authenticated and login to the privacy server. The privacy server further provides mechanisms for authenticated, logged in users to create and maintain private, user specific configuration data sets which include named lists of other users. Each list may be specific to a service provider platform, an organization, and other arbitrary groupings such as 'friends', 'family', 'bowling team', etc. Each list has associated encryption keys, which may be one or more asymmetric key pairs including a 'public' and 'private' key, and one or more symmetric keys. The privacy server provides mechanisms for secure communication of the configuration data between the privacy server, user, and privacy client (described below), for example using network protocols such as TLS.

The privacy client component provides a mechanism for the user, usually when used with a web browser or other application program, to be authenticated and login with the privacy server, and to access and manipulate the user specific data stored in the privacy server storage, including the lists of other users and associated encryption keys. The privacy client further provides a mechanism for the user to select one of the user lists previously configured on the privacy server, either as a default or for use with a specific piece of data to be submitted to a platform server. The privacy client further provides a mechanism to encapsulate user data with metadata identifying the user submitting the data, the named user list associated with the data, and a message authentication code (MAC) or digital signature, calculated using an encryption key corresponding to the selected user list, and to optionally encrypt the user data, prior to the data being submitted to a platform server.

The privacy client further provides a mechanism for a user, when viewing data stored on a platform server that has been submitted using the privacy client by any other user (and including the user viewing the data), to retrieve the encryption keys associated with the data being viewed and decrypt the data so that it may be viewed, if the user viewing the data has been included in the user list on the privacy server associated with the data to be viewed. The privacy client will further authenticate the data and provide an indication of authenticity to the user viewing the data if the data has not been modified since submitted and if the data was in fact authored by the author so indicated.

BRIEF DESCRIPTION OF THE DRAWINGS

This invention will be pointed out with particularity in claims appended to this application. The above and further advantages of this invention may be better understood by referring to the following description taken in conjunction with the accompanying drawings, in which:

DESCRIPTION OF THE PREFERRED EMBODIMENTS

The preferred embodiments of the present invention will be described with reference to FIGS. 1-7 of the drawings. Identical elements in the various figures are identified with the same reference numbers.

Figure 1:
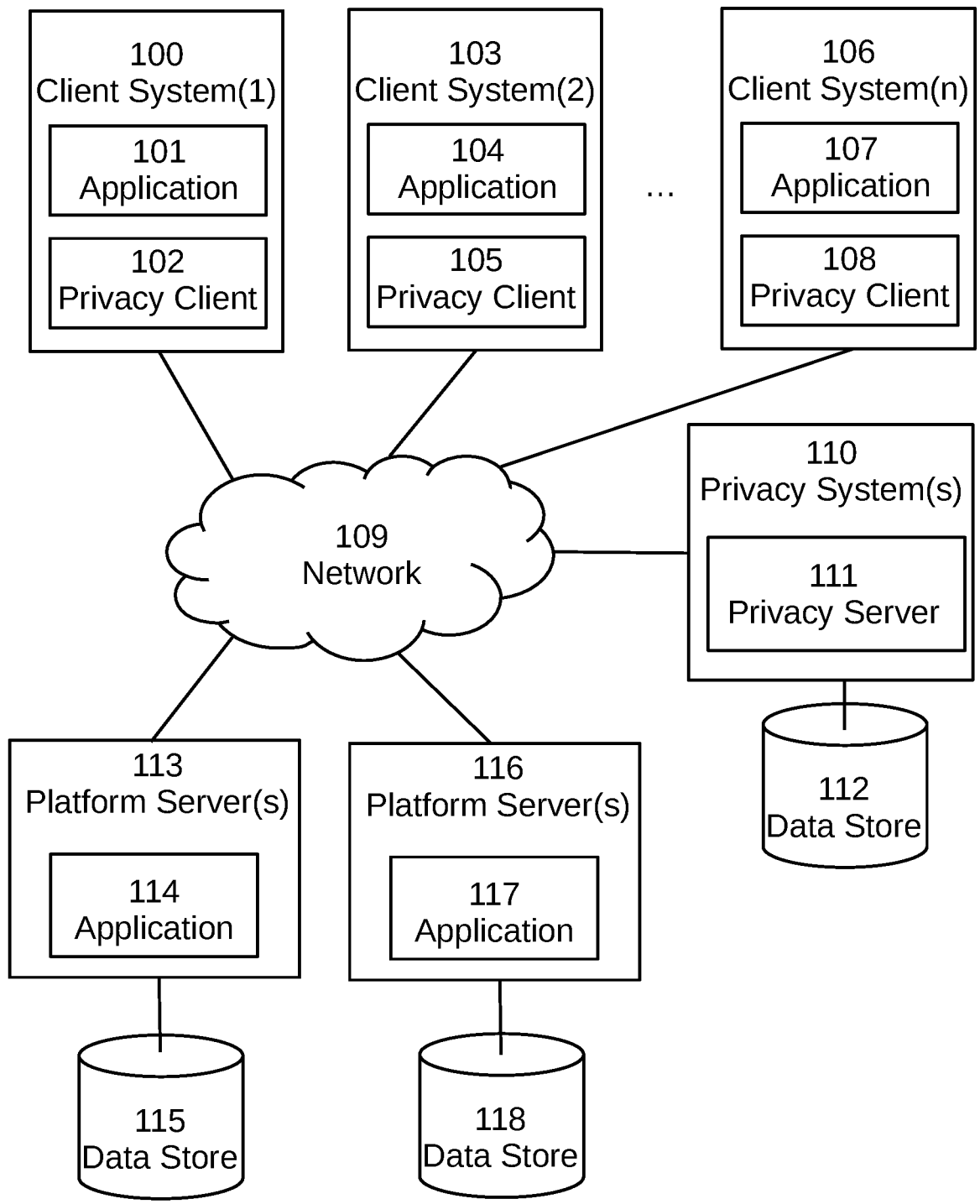
FIG. 1 is a conceptual block diagram of the environment in which the present invention is used.

Referring to FIG. 1, a conceptual block diagram of the environment in which the present invention is used is shown. The client systems 100, 103, and 106 are computer based systems such as a laptop or desktop computers, tablet computers, smart-phones, virtualized or containerized computer systems running on a server in a data center, or other computer based systems. The client applications 101, 104, and 107 are software components such as web browsers, smart-phone applications typically called 'apps', or other software applications running on the client systems which can be used to access the platform applications 114 and 117 over a network 109. The privacy clients 102, 105, and 108 are software components implementing part of the present invention, and may be implemented as additions to the client applications taking the form of 'plug-ins' or 'extensions' to the client application. The network 109 may be the public Internet, a private local area network, or any other means for providing communication between the connected components in FIG. 1. The platform applications 114 and 117 are service provider systems such as social media platforms, email systems, web sites, data sharing services, and other similar systems that may store data, including user submitted data, on data stores 115 and 118. The platform servers 113 and 116 are computer systems running the platform applications, such as server computers in data centers, virtualized or containerized instances of computer systems running on data center servers, dedicated computer servers running in local offices, and the like. In a large deployment, a given service provider platform may have many platform servers and data stores deployed, potentially in the millions. The privacy systems 110 are computer systems, such as server computers in data centers, virtualized or containerized instances of computer systems running on data center servers, dedicated computer servers running in local offices, and the like. The privacy servers 111 are software components running on the privacy systems and implementing part of the present invention. The privacy servers store configuration and other data on the data store 112. Many privacy systems and associated data stores may be deployed depending on the needs of the installation. Due to the modular nature of the various components, it is also possible for all the components 101, 102, 104, 105, 107, 108, 111, 112, 114, 115, 117, 118 shown in FIG. 1 to be co-located on a single computing system, for example for testing or other purposes. Although the components 101, 102, 104, 105, 107, 108, 111, 114, and 117 have been identified as software components, it is also possible for these components to be implemented directly in computer hardware or in some combination of computer hardware and software. For example, encryption/decryption operations may typically be implemented in computer hardware.

Figure 2:
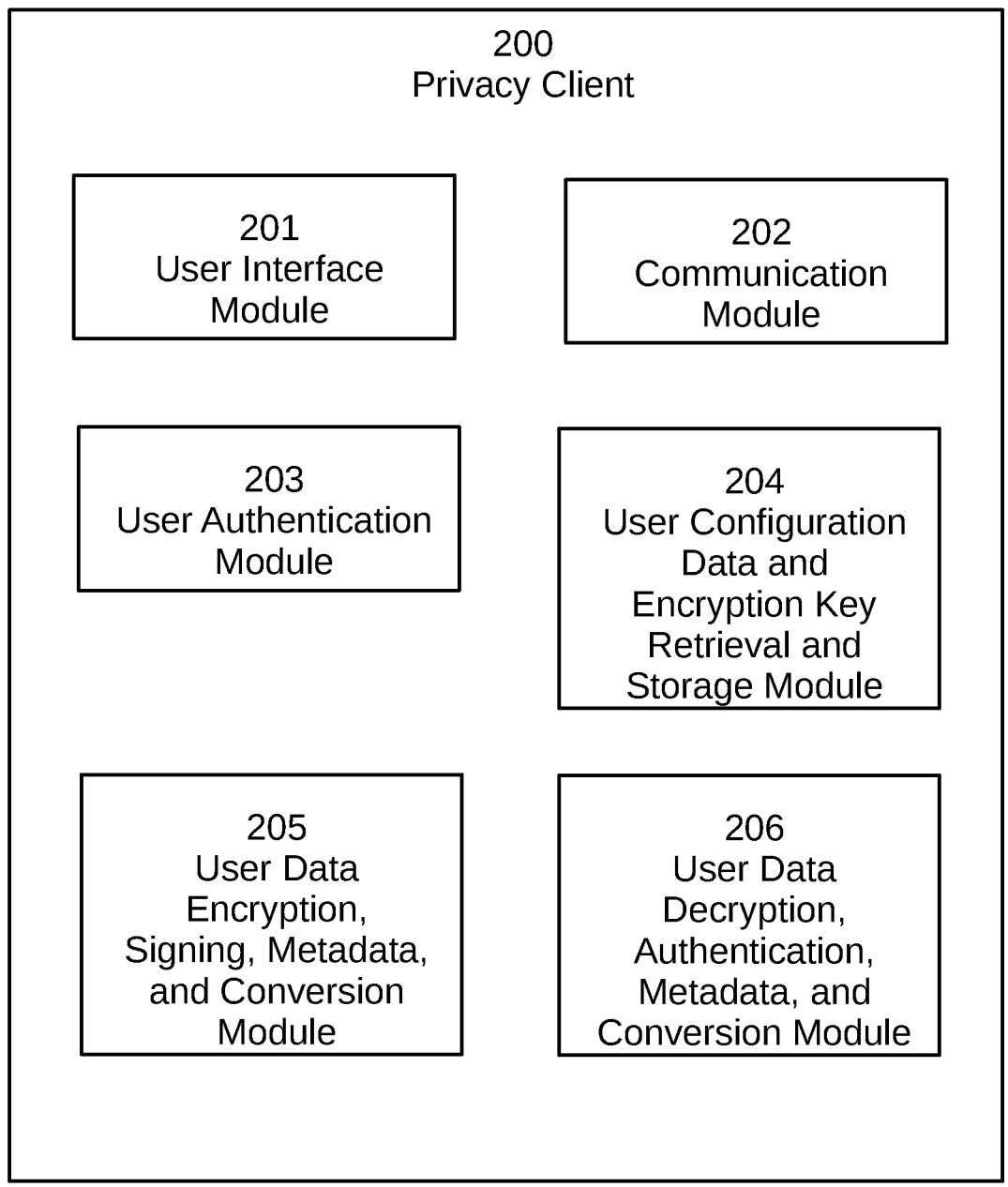
FIG. 2 is a conceptual block diagram of the privacy client component of the present invention.

Referring to FIG. 2, a conceptual block diagram illustrating a privacy client 200 is shown which is configured to provide data privacy in accordance with various aspects of the present invention. The privacy client 200 may include a user interface module 201, a communication module 202, a user authentication module 203, a user configuration data and encryption key retrieval and storage module 204, a user data encryption, signing, metadata, and conversion module 205, and a user data decryption, authentication, metadata, and conversion module 206. The user interface module 201 may be configured to provide a graphical or other user interface to a user so that the user may control and configure various aspects of the privacy client, for example entering and selecting user authentication data and entering configuration data. The communication module 202 may be configured to provide communication to other components shown in FIG. 1 such as the privacy server 111, over a network or other communication mechanism, including establishment of a secure communication channel such as using TLS protocol. The user authentication module 203 may be configured to enable a user to authenticate with another component such as the privacy server 111, using various authentication methods such as username/password verification, biometric verification, authentication tokens, user questions, third party authentication, or other methods deemed suitable. The user configuration data and encryption key retrieval and storage module 204, may be configured to retrieve user configuration data and encryption keys from the privacy server 111, to store this data in temporary storage for later use, to provide this data to other modules such as 205 and 206 in FIG. 2, and to delete the data from temporary storage when appropriate. The user data encryption, signing, metadata, and conversion module 205 may be configured to transform user data by calculating a message authentication code or digital signature from the data and an encryption key, encrypting the data, adding metadata including information used to later locate the associated encryption keys, adding metadata including the message authentication code, and converting the data and metadata to a format compatible with the platform application to which the data is to be submitted, and then providing the result for transmission to the platform application 114. The user data decryption, authentication, metadata, and conversion module 206 may be configured to transform user data received from a platform application, where said user data has been previously transformed by 205, by reversing the effect of previous conversion to the platform application format, using the metadata to locate a decryption key, decrypting the received user data, calculating a message authentication code or digital signature from the data and compare it to that in the received metadata, and providing the resulting decrypted user data and authentication check status for display to the user, for example by providing the result to the client system application 101.

Figure 3:
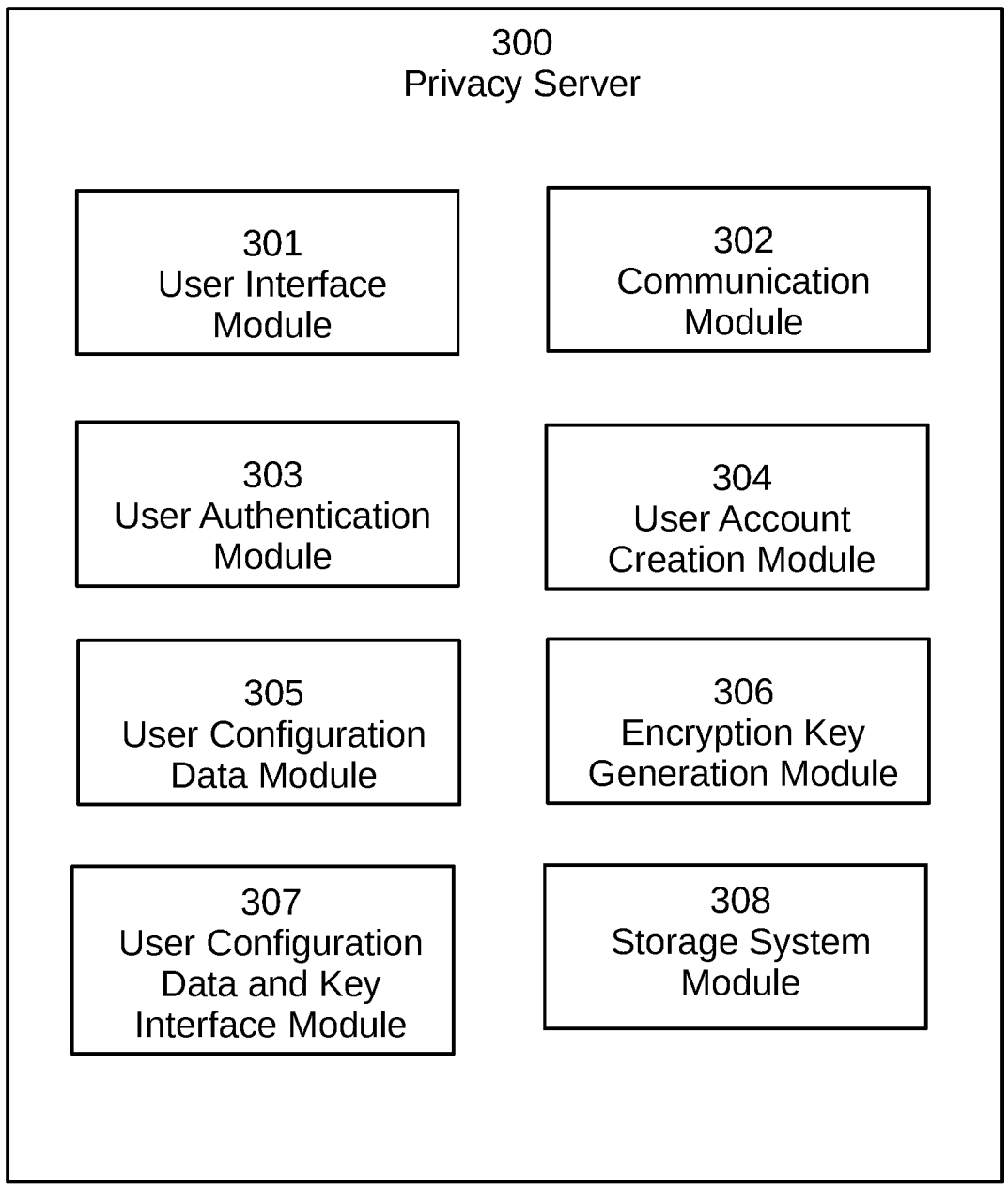
FIG. 3 is a conceptual block diagram of the privacy server component of the present invention.

Referring to FIG. 3, a conceptual block diagram illustrating a privacy server 300 is shown which is configured to provide data privacy in accordance with various aspects of the present invention. The privacy server 300 may include a user interface module 301, a communication module 302, a user authentication module 303, a user account creation module 304, a user configuration data module 305, an encryption key generation module 306, a user configuration data and key interface module 307, and a storage system module 308. The user interface module 301 may be configured to provide a graphical or other user interface to a user so that the user may control and configure various aspects of the privacy server, for example creating user accounts. The communication module 302 may be configured to provide communication to other components shown in FIG. 1 such as the privacy client 102, over a network or other communication mechanism, including establishment of a secure communication channel such as using TLS protocol. The user authentication module 303 may be configured to enable a user to authenticate with the privacy server from another component such as the privacy client 102, using various authentication methods such as username/password verification, biometric verification, authentication tokens, user questions, third party authentication, or other methods deemed suitable. The user account creation module 304 may be configured to enable a user to establish an account on the privacy server for use in storing configuration and other data. The user configuration data module 305 may be configured to enable a user to enter, modify, store, and delete user configuration data used in accordance with the present invention and as described below. The encryption key generation module 306 may be configured to generate encryption keys, including symmetric keys or asymmetric key pairs, using various standards, for example AES or RSA, to be used when encrypting, decrypting, signing, and authenticating user data. User passphrases may be used when generating encryption keys, which may be used to control access to the keys. The user configuration data and key interface module 307 may be configured to provide some or all of the user configuration data and encryption keys to other components such as the privacy client 102, for example when the user has been authenticated using 303 and the user is in the process of submitting user data to a platform application 114 and the user data will be protected in accordance with the present invention. The storage system module 308 may be configured to save and restore user authentication data, and user configuration and key data, to data storage such as external disc storage, non-volatile ram, volatile memory, or other types of storage that may be used in accordance with the present invention.

Figure 4:
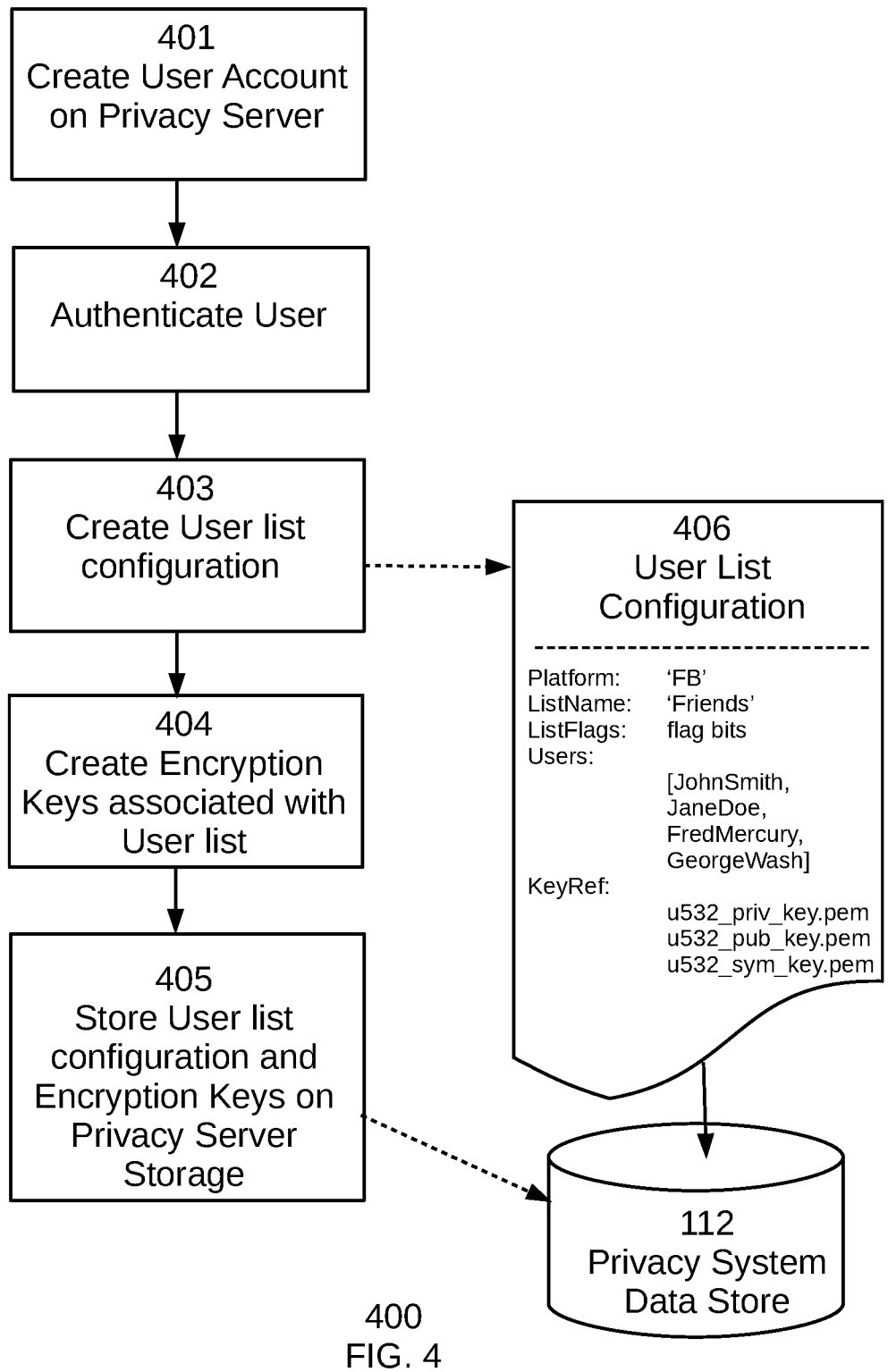
FIG. 4 is a conceptual flow diagram of a process for providing configuration of user configuration data on the Privacy Server in accordance with the present invention.

Referring to FIG. 4, a flow diagram illustrating a process for providing configuration of user configuration data on the privacy server in accordance with various aspects of the present invention is shown. Although the operations in process 400 are depicted in a specific order, certain operations may be performed in a different order or at the same time. A user as referred to herein may refer to an individual person, an organization, or a computer system executing a computer program. At some point, e.g. at operation 401, the privacy server 111 of FIG. 1 may receive a request from a user via a client system such as 103 of FIG. 1 to create an account on the privacy server. The privacy server will collect user identification information such as name, email address, etc. as well as authentication information such as a username and password, or other data that can be used in various user authentication mechanisms that may be employed, including third party authentication. The privacy server will then save this user information to privacy system data store 112, or some other storage system used for maintaining user accounts and authentication data. At some later time e.g. 402, the privacy server will receive a request from user to login, at which time the privacy server will authenticate the user in order to allow access to the user configuration data. Various authentication methods deemed suitable for use may be employed. At some later time 403, once the user has been authenticated, the user will send information to the privacy server in order to configure one or more named lists of users. As depicted in 406, the configuration data for a specific user list may include a platform selector, i.e. an identifier of the social media, email, data sharing or other service provider platform the list will be used with, a human readable list name, and a list of usernames of users on the service provider platform for which this list will apply. The privacy server will then, at 404, generate one or more encryption keys to be used with the user list 406, add either the keys, or a reference to the key files to the user list, and will, at 405, store the keys and the list to the privacy system data store 112. A user passphrase may be used when generating the keys, and the passphrase may later be needed to utilize the keys. The generated keys may be asymmetric or symmetric keys, including public/private key pairs. The data items depicted in 406 are provided as an illustrative representation and additional data items of various types and purposes may be provided. Creation of a user account at 401 will likely occur only once when a specific user begins using the privacy system for the first time. Authentication of a user at 402 will occur every time a given user begins interacting with the privacy server; once authenticated, multiple user transactions may occur without re-authenticating. The authentication may remain valid for a specific amount of time following the last user transaction (i.e. a timeout), or may be invalidated through some other means. Creation of a user list at 403 and creation of associated encryption keys at 404 may only occur once for each separate list a given user creates on the privacy server. Modifications to the user list 406 will occur at any time a user desires to add or remove usernames from the list. Re-generation of encryption keys may also optionally occur at user request, for example, if the user believes the encryption keys have been compromised and would like to create new ones. The encryption keys may be generated and used with various encryption standards such as AES, RSA, or others deemed suitable for use with the privacy system.

Figure 5:
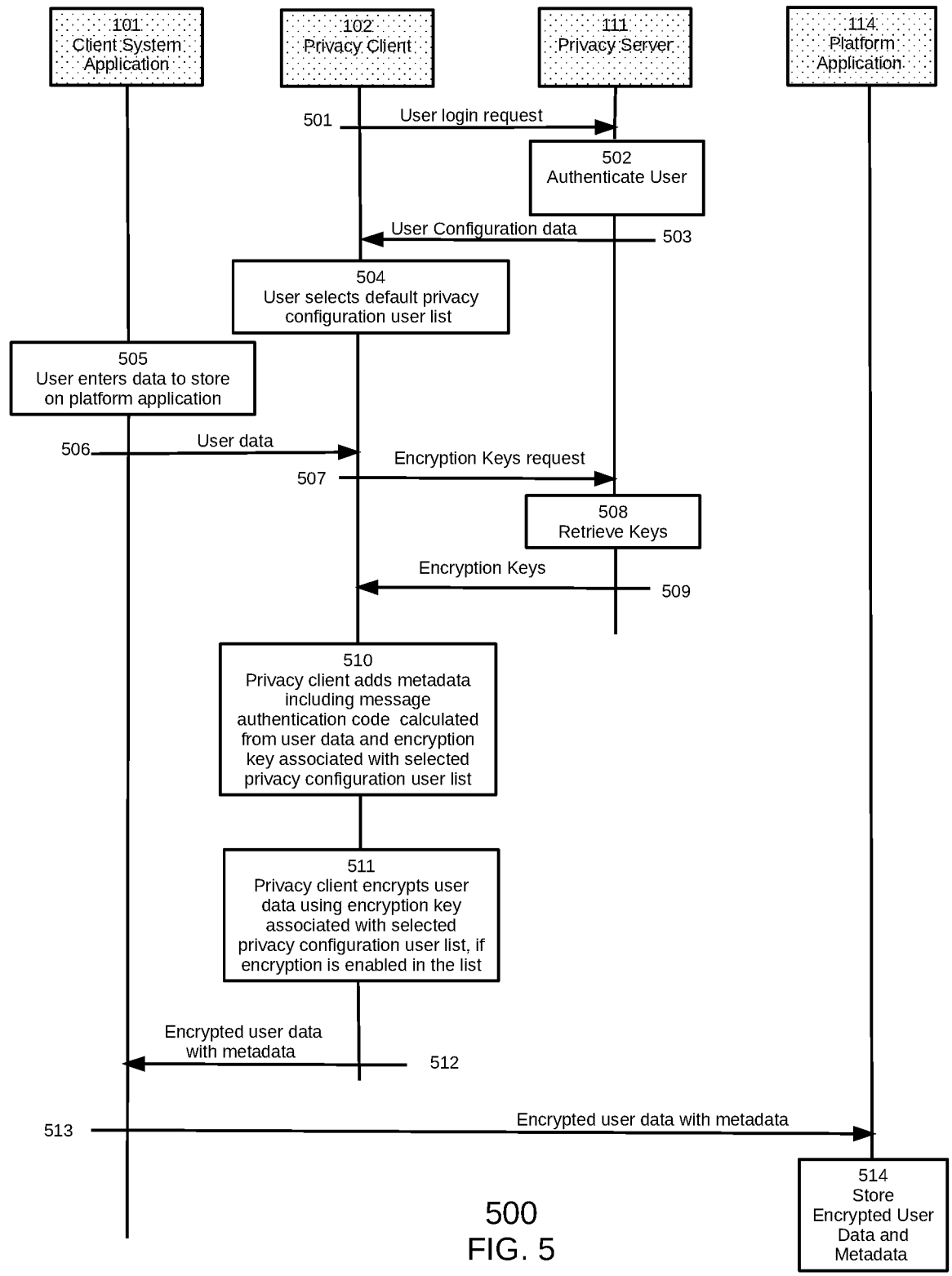
FIG. 5 is a communication diagram illustrating a process for providing privacy and authentication of a piece of user data when written to a platform application in accordance with the present invention.

Referring to FIG. 5, a communication diagram illustrating a process for providing privacy and authentication of a piece of user data when written to a platform application 114 in accordance with the various aspects of the present invention is shown. Although the operations in process 500 are depicted in a specific order, certain operations may be performed in a different order or at the same time. A user as referred to herein may refer to an individual person, an organization, or a computer system executing a computer program. At 501 a user sends a login request from privacy client 102 to privacy server 111. In this illustrative example, the user login request to the privacy server occurs prior to entering user data for storage on the platform application. The privacy server 111 will then authenticate the user at 502, using an appropriate means of authentication, such as username/password verification, multi factor authentication, 3rd party authentication, or any other method that may be suitable for use. Following user authentication, at 503, the privacy server will send back to the privacy client the relevant user configuration data. As described above, the configuration data on the privacy server may consist of a number of platform application specific named lists of users corresponding to other users on the specific platform which are to have access to platform data entered by the current user, and one or more associated encryption keys or key pairs. In the example situation depicted in FIG. 5, in which the user is submitting data to the platform application for storage, the configuration data needed at 503 are 4-tuples consisting of the list name, a list id, a platform identifier, and a flags word. The corresponding encryption keys which may be asymmetric or symmetric key pairs would not be needed at step 503 in this embodiment example. The users listed as authorized for this configuration list are also not required by the privacy client at step 503. These 4-tuples may be stored, or 'cached' by the privacy client while the user login is in effect such that they can be used without having to re-transmit them from the privacy server. The user login process may occur once during a specified period of time, such as once per month, and while logged in many pieces of user data may be protected without having to re-login. At 504, the user uses the privacy client 102 to select a default user list name from among the plurality of user list names (and associated 4-tuples) that may have been transmitted from the privacy server. At 505, the user enters data through the client system application 101 to be submitted to the platform application 114. For example, the user may be using a web browser to make a posting on the user's home page on a social media service. This user data may take the form of text, video, audio, or any other form of digital data that the platform application allows the user to submit. At 506, the user submits the user data and it is transferred or otherwise made available to the privacy client 102. In a representative embodiment where the privacy client consists of a plug-in or extension to a web browser, the privacy client will be notified when the user submits the data and can then access and manipulate the user data prior to it being transmitted to the platform application. At 507, the privacy client 102 transmits a request to the privacy server 111 to retrieve the encryption keys associated with the user list that has been selected in the privacy client from among the plurality of user lists that have been configured by the logged in user on the privacy client. The keys may be protected by a user passphrase which the user may be required to enter in order to use the keys for encryption. At 508 the encryption key(s) associated with the selected user list are retrieved by the privacy server 111 and returned to the privacy client 102 at 509. At 510, the privacy client adds metadata to the user data. The metadata includes the list id and flags word of the user list chosen for association with the data. This information will allow another user viewing the data, using the privacy client, to associate the data with corresponding configuration data on the privacy server. The privacy client will further calculate a message authentication code (MAC) or digital signature using an algorithm deemed suitable for use, over the user data being submitted and using the retrieved encryption key associated with the selected user list. The MAC or digital signature will be added to the metadata. At 511 the privacy client will encrypt the user data, if encryption is enabled for the selected list. The flags word of the selected list may contain an indication that the user data should be encrypted or not encrypted, and so is part of the user list configuration shown at 406 in FIG. 4. Inclusion of the MAC or digital signature, without encrypting the user data, would find use when a user submits data that is to be viewable by all other users, but the user also wants to insure that the data cannot be modified following submission, without such modification being detected. Also, this case enables the author of the data to be authenticated by the viewers; i.e. they can be certain that the stated author is the actual author. In this case of authentication without encryption, the user list configuration may have an empty list of users, i.e. meaning that all users may view the data. At 512, the transformed user data, which may be encrypted, and now includes the metadata, is transferred back to the client system application 101, and then at 513 the transformed user data is sent to the platform application 114, which at 514 stores the transformed user data on the platform server data store 115, 118 in FIG. 1. The detailed format of the transformed user data will depend on the application platform in use, and is made to be compatible with the requirements of the platform application. For example, if the user data being submitted is normally in the form of a text field encoded using the ASCII character set, then the transformed data will also use the same character set. Thus the added metadata, MAC or digital signature, and encrypted user data will be converted to a form that uses only ASCII characters, such as representing every 6 binary bits as an ASCII character from A-Z, a-z, 0-9, +, and /, also known as Base64 encoding which is widely used on the internet. Similar conversions may be implemented for other data formats including video and audio. As stated previously the specific order of the steps may be changed, for example, the user login request may occur following 505 instead of before it, and selection of a user list at step 504 may occur at step 506 when the user enters a specific piece of data; for example if the client system application 101 is email, then each email message may be associated with a specific user list, such as a 'friends' list or a 'family' list. Similarly it is possible to retrieve encryption keys in advance of needing them, for example at step 503, and save them in the privacy client until needed at step 510, although doing this may increase security vulnerabilities.

Figure 6:
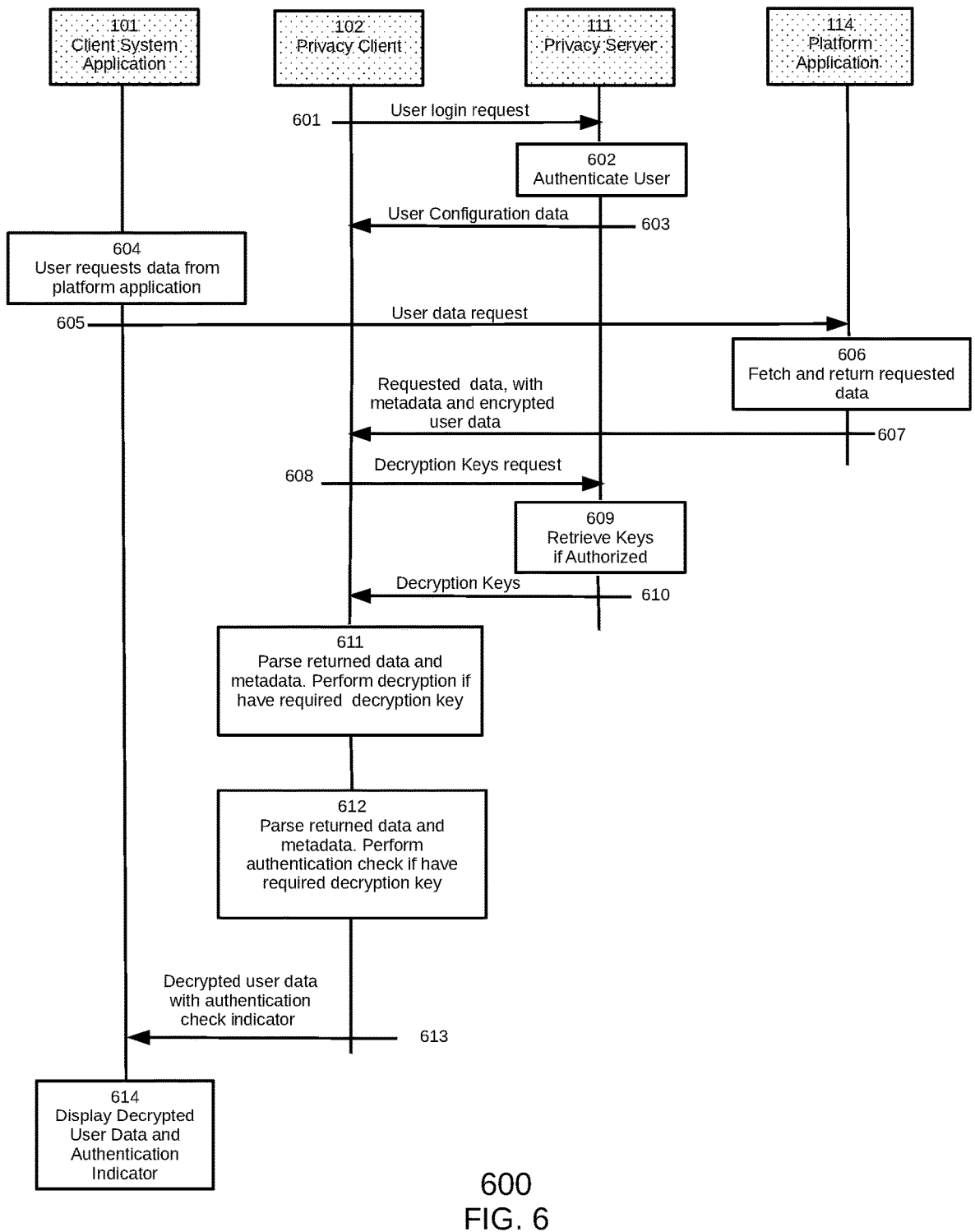
FIG. 6 is a communication diagram illustrating a process for viewing and authenticating a piece of user data previously written to a platform application in accordance with the present invention.

Referring to FIG. 6, a communication diagram illustrating a process for providing privacy and authentication of a piece of user data when received from a platform application 114 in accordance with the various aspects of the present invention is shown. At 601 a user sends a login request from privacy client 102 to privacy server 111. In this illustrative example, the user login request to the privacy server occurs prior to requesting data from the platform application. The privacy server 111 will then authenticate the user at 602, using an appropriate means of authentication, such as username/password verification, multi factor authentication, 3rd party authentication, or any other method that may be suitable for use. Following user authentication, at 603, the privacy server will send to the privacy client the relevant user configuration data. This configuration data is described above for FIG. 5 at step 503. In the present example of FIG. 6 the list configurations previously entered by the currently logged in user are not needed for the decryption process described here, but would be returned for use as in step 503, above. At 604 and 605, the user requests data from the platform application using the client system application 101. At 606 the platform application 114 will retrieve the requested data, some of which may be from platform server data store 115, 118 in FIG. 1, and at 607 return it to the client system application. The privacy client 102 will parse the returned data prior to it being received by the client system application. At 608, if the privacy client detects pieces of data in the returned data that have been previously protected using the privacy client, it will request needed decryption keys from the privacy server 111. The request will include the metadata associated with the user data, which will contain the user list id, flags word, and other information that was previously written to the platform application by the privacy client when the user that originated the data sent it to the platform application. The metadata thus allows the privacy server 111 to retrieve the needed decryption keys at 609. The privacy server will return the decryption keys at 610 if the currently logged in user is listed as an authorized user in the corresponding user configuration list, as identified by the list id in the metadata. Thus, the decryption keys needed to authenticate and decrypt the user data are only made available to users whom the data originator has configured and authorized. For example, assume user A enters a user configuration list named FRIENDS for social media system FB that includes users B, C, and D but not E. Then user A selects the FRIENDS list when making a posting on his FB page, which results in the posting being encrypted. When user B is logged in to the privacy server, the decryption keys for user A's FB FRIENDS list will be sent to user B when requested, so that when user B views A's FB posting, the privacy client will be able to decrypt it. Similar for users C and D. However, the privacy server will not transmit the decryption keys to user E, because user E is not listed in A's FB FRIENDS configuration list. Therefore user E will not be able to view the posting. Assuming the decryption keys are returned at 610, at 611 the privacy client will decrypt the user data if it was encrypted. Then at 612 it will perform a data authentication check by calculating a message authentication code (MAC) or digital signature and comparing it to the value stored in the metadata. Finally at 613 the decrypted and/or authenticated user data will be returned to the client system application for display to the user at 614. In the case of decrypted data, it will be displayed to the user in it's original form prior to encryption. In the case of authenticated data, a green checkmark or other visible indicator will be displayed to indicate the data is authentic. If the required encryption keys are not available at 609, the privacy client may replace the protected data with a user visible message indicating that the data is protected but they do not have the requisite permission to view the data. Numerous other alternatives are possible for handling this case, including hiding the data so that the user is not made aware that the data exists at all. Another condition would be that the user does not have the privacy client installed on the client system when user data protected in accordance with the present invention is read from the platform application. In this case, the user data may be displayed as a message indicating to the user that the privacy client must be installed to view the user data. In the representative illustrations presented, the specific user configuration data needed for the communication diagrams of FIG. 5 and FIG. 6 is slightly different. However, all the user configuration data needed by either FIG. 5 or FIG. 6 may be sent from the privacy server to the privacy client at once to avoid multiple transmissions. It is also possible that the privacy client may be configured to only request user configuration data for the specific operation it is performing, i.e. transforming user data prior to transmission to an application server, or transforming user data following receipt of data from an application server. It is understood that various implementations or embodiments fall within the scope of the invention.

Figure 7:
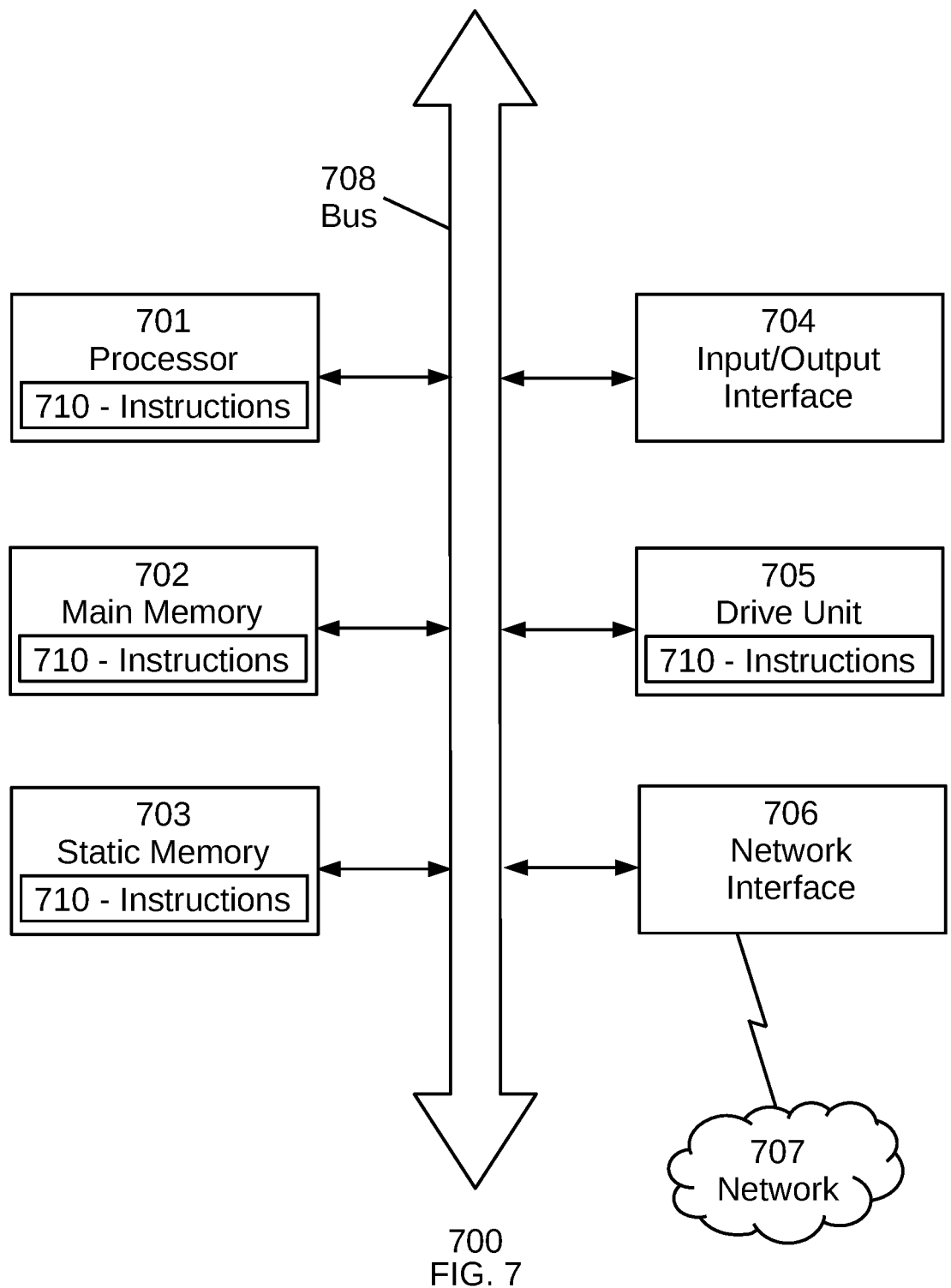
FIG. 7 is a block diagram of a computer system with which any of the clients, servers, or applications shown in FIG. 1 may be implemented in accordance with the present invention.

Referring to FIG. 7, a block diagram illustrating a computer system with which any of the clients and servers if FIG. 1 may be implemented in accordance with the various aspects of the present invention is shown. In certain aspects the computer system 700 may be implemented using hardware or a combination of hardware and software, in a dedicated server, integrated into another entity, or distributed across multiple entities. The example computer system 700 includes a processor 701, a main memory 702, a static memory device 703, an input/output interface 704, a disk drive unit 705, and a network interface device 706, that communicate with each other across a bus 708. Processor 701 may be a general purpose microprocessor, a graphics processing unit, a microcontroller, a digital signal processor, an application specific integrated circuit, a field programmable gate array, a programmable logic device, a controller, a state machine, gated logic, discrete hardware components, or any other entity that can perform calculations or other manipulations of information. The input/output interface 704 may be configured to communicate with various input/output devices such as video display units including liquid crystal displays, cathode ray tubes, or touch screens, alphanumeric input devices such as keyboards, a cursor control device such as a mouse, or a signal generation device such as a speaker. A machine readable medium, also known as computer readable medium, may store one or more sets of instructions 710 embodying one of more of the methodologies or functions described herein. The instructions 710 may also reside, completely or at least partially, within the main memory 702 and/or within the processor 701 during execution thereof by the computer system 700, with the main memory 702 and the processor 701 also constituting machine readable media. The instructions 710 may further be transmitted or received over a network 707 via the network interface 706. The machine readable medium may include the drive unit 705, the static memory 703, the processor 701, the main memory 702, an external memory connected to the input/output interface 704, or some other memory. Machine readable media shall also be taken to include any non-transitory medium that is capable of storing, encoding, or carrying a set of instructions for execution by the machine and that cause the machine to perform any one or more of the methodologies of the embodiments discussed herein. Machine readable medium shall include, but not be limited to, storage mediums such as solid-state memories, optical media, and magnetic media.

Those skilled in the art will appreciate that the various illustrative blocks, modules, elements, components, methods, and algorithms described herein may be implemented as electronic hardware, computer software, or combination of both. To illustrate this interchangeability of hardware and software, various illustrative blocks, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently, arranged in a different order, or partitioned in a different way, all without departing from the scope of the present invention.

What is claimed is:

1. A method for providing data privacy, access control, and authentication of user data, the method comprising:
   receiving, at a privacy server, a user authentication request from a user via a privacy client;
   authenticating the user;
   receiving, at a privacy client, user data to be submitted to a platform server, application, or data store;
   receiving, at a privacy server, a request for user configuration data, from the privacy client, where the user configuration data consists of user specific data containing encryption keys and other information associated with a specific grouping or list of other users;
   providing the requested user configuration data and encryption keys from the privacy server to the privacy client;
   adding metadata to the user data at the privacy client, said metadata including information sufficient to enable later retrieval of associated user configuration data and encryption keys from the privacy server;
   adding a digital signature to the user data and the metadata at the privacy client, said digital signature calculated from the user data using a first encryption key returned from the privacy server;
   encrypting the user data at the privacy client using a second encryption key returned from the privacy server, if encryption is enabled by the user configuration data;
   adding a message authentication code to the meta data, the digital signature, and the user data at the privacy client, said message authentication code calculated from the meta data, the digital signature, and the user data using a third encryption key returned from the privacy server;
   encoding the metadata, the digital signature, the user data, and the message authentication code at the privacy client to a format compatible with the platform server, application or data store; and
   submitting the encoded metadata, digital signature, user data, and message authentication code to the platform server, application, or data store;
   wherein the privacy client includes a user interface module, communication module, user authentication module, user configuration data and encryption key retrieval and storage module, and user data encryption, signing, metadata, and conversion module; and
   wherein the privacy server includes a user interface module, communication module, user authentication module, user account creation module, user configuration data module, encryption key generation module, user configuration data and key interface module, and storage system module.

2. The method of claim 1, where the encryption keys are symmetric keys.

3. The method of claim 1, where the encryption keys are asymmetric keys.

4. The method of claim 1, where the encryption keys are generated and protected by a passphrase.

5. A method for providing data privacy, access control, and authentication of user data, comprising:
   receiving, at a privacy server, a user authentication request from a user via a privacy client;
   authenticating the user;
   receiving, at a privacy client, user data and associated metadata, digital signature, and message authentication code from a platform server, application, or data store;
   receiving, at a privacy server, a request for user configuration data, from the privacy client, where the user configuration data consists of user specific data containing decryption keys and other information associated with a specific grouping or list of users;
   providing the requested user configuration data and decryption keys from the privacy server to the privacy client, if authorized;
   authenticating received user data and associated meta data and digital signature, at the privacy client, using received first decryption key and the message authentication code;
   decrypting, at privacy client, received user data using received second decryption key, if the received user data was received in encrypted form;
   authenticating the user data at privacy client, using received third decryption key and digital signature associated with received user data; and
   providing user data and indication of data authentication result to the user,
   wherein the privacy client includes a user interface module, communication module; user authentication module, user configuration data and encryption key retrieval and storage module, and user data encryption, signing, metadata, and conversion module; and
   wherein the privacy server includes a user interface module, communication module, user authentication module, user account creation module, user configuration data module, encryption key generation module, user configuration data and key interface module, and storage system module.

6. The method of claim 5, where the decryption keys are symmetric keys.

7. The method of claim 5, where the decryption keys are asymmetric keys.

8. The method of claim 5, where the decryption keys are generated and protected by a passphrase.

9. A system for providing privacy, access control, and authentication of user data, the system comprising:
   one or more processor devices; and
   a non-transitory machine-readable medium comprising instructions stored therein, which when executed by the one or more processors, cause the one or more processors to perform operations comprising:
   receiving, at a privacy server, a user authentication request from a user via a privacy client;
   authenticating the user;

receiving, at a privacy client, user data to be submitted to a platform server, application, or data store;

receiving, at a privacy server, a request for user configuration data, from the privacy client, where the user configuration data consists of user specific data containing encryption keys and other information associated with a specific grouping or list of other users;

providing the requested user configuration data and encryption keys from the privacy server to the privacy client;

adding metadata to the user data at the privacy client, said metadata including information sufficient to enable later retrieval of associated user configuration data and encryption keys from the privacy server;

adding a digital signature to the user data and the metadata at the privacy client, said digital signature calculated from the user data using a first encryption key returned from the privacy server;

encrypting the user data at the privacy client using a second encryption key returned from the privacy server, if encryption is enabled by the user configuration data;

adding a message authentication code to the meta data, the digital signature, and the user data at the privacy client, said message authentication code calculated from the meta data, the digital signature, and the user data using a third encryption key returned from the privacy server;

encoding the metadata, the digital signature, the user data, and the message authentication code at the privacy client to a format compatible with the platform server, application or data store; and submitting the encoded metadata, digital signature, user data, and message authentication code to the platform server, application, or data store;

wherein the privacy client includes a user interface module, communication module, user authentication module, user configuration data and encryption key retrieval and storage module, and user data encryption, signing, metadata, and conversion module; and wherein the privacy server includes a user interface module, communication module, user authentication module, user account creation module, user configuration data module, encryption key, generation module, user configuration data and key interface module, and storage system module.

10. The system of claim 9, where the encryption keys are symmetric keys.

11. The system of claim 9, where the encryption keys are asymmetric keys.

12. The system of claim 9, where the encryption keys are generated and protected by a passphrase.

13. A non-transitory machine-readable medium comprising instructions stored therein, which when executed by a machine, cause the machine to perform operations comprising:

receiving, at a privacy server, a user authentication request from a user via a privacy client;

authenticating the user;

receiving, at a privacy client, user data and associated metadata, digital signature, and message authentication code from a platform server, application, or data store;

receiving, at a privacy server, a request for user configuration data, from the privacy client, where the user configuration data consists of user specific data containing decryption keys and other information associated with a specific grouping or list of users;

providing the requested user configuration data and decryption keys from the privacy server to the privacy client, if authorized;

authenticating received user data and associated meta data, and digital signature, at the privacy client, using received first decryption key and the message authentication code;

decrypting, at privacy client, received user data using received second decryption key if the received user data was received in encrypted form;

authenticating the user data at privacy client, using received third decryption key and digital signature associated with received user data; and providing user data and indication of data authentication result to the user, wherein the privacy client includes a user interface module, communication module, user authentication module, user configuration data and encryption key retrieval and storage module, and user data encryption, signing, metadata, and conversion module; and wherein the privacy server includes a user interface module, communication module, user authentication module, user account creation module, user configuration data module, encryption key generation module, user configuration data and key interface module, and storage system module.

14. The non-transitory machine-readable medium of claim 13, wherein the operations further comprise:

using a symmetric decryption key.

15. The non-transitory machine-readable medium of claim 13, wherein the operations further comprise:

using an asymmetric decryption key.

16. The non-transitory machine-readable medium of claim 13, wherein the operations further comprise:

generating and protecting the decryption keys using a passphrase.

* * * * *